Oct. 23, 1962 J. C. GARDNER 3,059,373
INSECT KILLING LAMP
Filed June 16, 1961
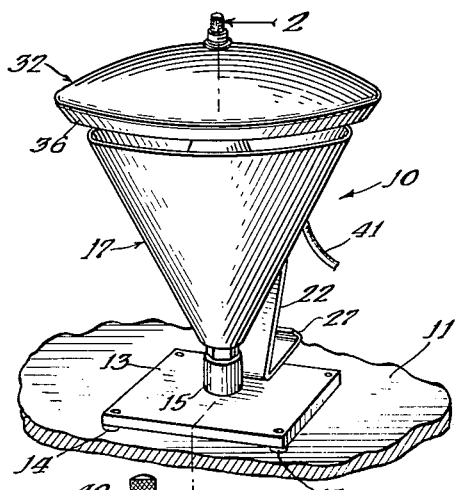
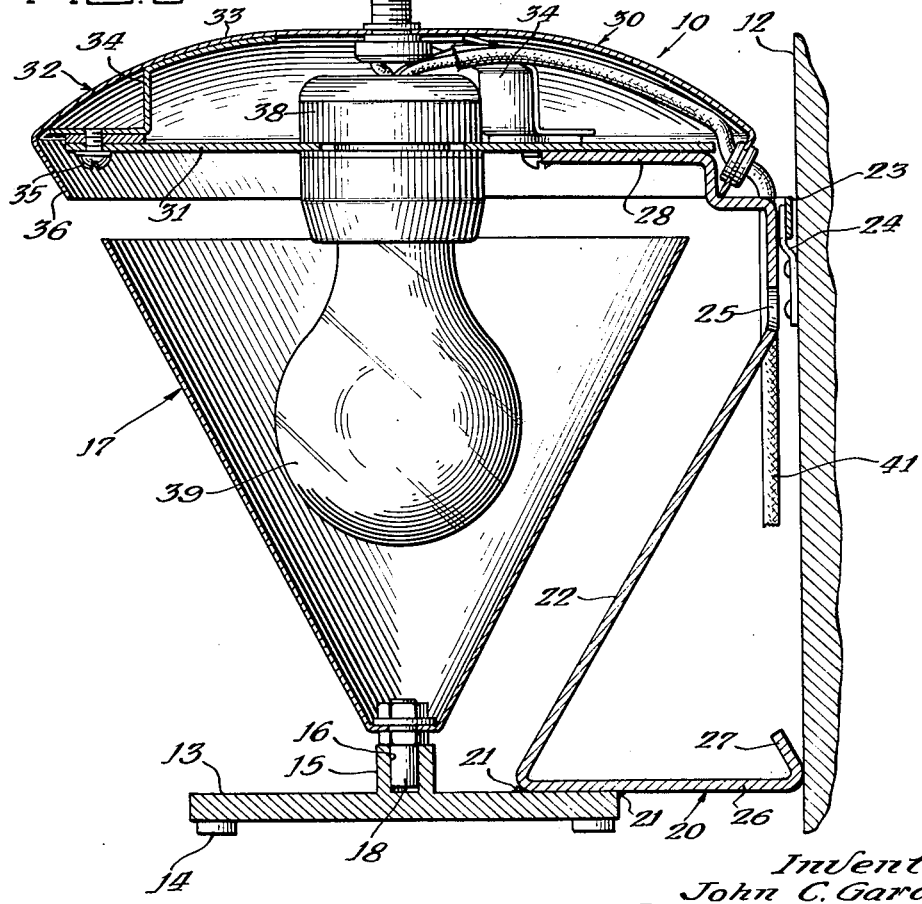
Inventor:
John C. Gardner
By: Hofgren, Brady, Wegner,
Allen & Wellman
Attorneys

United States Patent Office 3,059,373
Patented Oct. 23, 1962

3,059,373
INSECT KILLING LAMP
John C. Gardner, Horicon, Wis., assignor to Gardner Manufacturing Co., a corporation of Wisconsin
Filed June 16, 1961, Ser. No. 117,566
1 Claim. (Cl. 43—113)

This invention relates to a lamp, and more particularly to an insect exterminating electric lamp.

Flying insects such as gnats and mosquitos are a constant source of annoyance, particularly at late evening and night during the warmer months. Such insects are annoying even in the absence of artificial illumination, and the number of these insects often becomes unbearable when lights are turned on.

"Insect repellent" lamps are in common usage as an attempt to thwart these tiny winged beasts. Such lamps are warm, commonly yellowish color, but as is generally admitted they do not repel insects but rather offer less attraction for insects than common white or clear electric light bulbs. Insect repellent candles, sprays, powders, and lotions are also in general use. All of the previously mentioned expedients can have some utility in combating the flying insect menace, but as is generally recognized some flying insects invariably survive these precautions to the harassment of nocturnal humanity.

In order to further thwart flying insects which manage to survive such repellents, various insect exterminating lamps have been devised, as is indicated by the following United States Letters Patents: 389,482; 779,672; 988,476; 1,168,798; 1,304,397; 1,666,509; 1,713,557; 1,833,699; 2,113,409; 2,198,807; and 2,791,864. These patents span about three quarters of a century, from the kerosene light era to the present day, but still insect exterminating lamps are not readily accepted by the public, particularly for home use.

Most of the prior art devices are unsightly, especially after a few bugs have been exterminated. The source of light is usually directly visible and sometimes blinding, and insects or parts of insects tend to adhere to a hot bulb and create an even more unsightly mess. In addition to being generally unsightly most of the prior art insect exterminating lamps have bug contacting portions which are difficult to empty and clean. One of the most unpleasant aspects of these insect exterminating lamps is the use of transparent or translucent material for holding the remains of the insects so that they are visible from outside the device. Transparent or translucent shielding material also permits the light to be projected above and below the device, often projecting shadows of the deceased insects, and this is revolting to many people. As a result, insect exterminating lamps in general have not received wide acceptance.

It is, therefore, a primary object of this invention to provide a new and improved insect exterminating lamp.

Another object of this invention is to provide a new and improved insect exterminating lamp which is both effective and attractive.

Still another object is the provision of an attractive insect exterminating lamp suitable for both indoor and outdoor use.

Still another object is the provision of a new and improved insect exterminating lamp in which dead insects, and the insect contacting surfaces of the lamp are effectively concealed from view. A related object is provision for effectively preventing projection of shadows of the insects.

A further object is the provision of a new and improved insect exterminating lamp which is easily emptied and cleaned.

A still further object is the provision of such a lamp which may alternatively be supported on a horizontal surface or a vertical surface.

Another object is the provision of such a lamp having a bulb which provides illumination for attracting flying insects and generates heat for killing the insects and evacuating air from a portion of the lamp to suffocate insects entrapped therein. A related object is the provision of such illumination in the form of a cold color electric light bulb for more effectively attracting insects.

A more specific object is the provision of a new and improved insect exterminating electric lamp having a hood overlying and spaced from the open upper end of a container removably encasing a light bulb which depends from the hood. A related object is provision for insulating the hood to maintain it relatively cool. Another related object is the provision of an opaque hood and container, with a narrow space therebetween for projection of a beam of light to attract insects while preventing illumination above and below the lamp, and for entrance of insects into the lamp.

Other objects and advantages will become readily apparent from the following detailed description taken in connection with the accompanying drawings, in which:

FIGURE 1 is a perspective view of an insect exterminating lamp illustrating an embodiment of the invention, with the lamp supported on a horizontal surface; and FIGURE 2 is an enlarged vertical section taken generally along the line 2—2 of FIGURE 1, but with the lamp supported on a vertical surface.

The invention is, in brief, directed to an insect exterminating lamp having a base for supporting the lamp on a horizontal surface, and a handle member extending upwardly from the base for alternatively supporting the lamp on a vertical surface. The upper end of this member mounts a hood which overlies the base. The hood mounts a depending cold color electric light bulb, is insulated against heat from the bulb, and has an electric switch for turning the light bulb on and off. A container for suffocating and holding dead insects encases the light bulb and is removably mounted on the base. This container has an open upper end spaced slightly below the hood so that a beam of light is projected generally horizontally outwardly from the lamp for attracting insects. Both the hood and container are preferably imperforate and of opaque material to effectively conceal the bulb and to avoid casting shadows of dead insects and illuminating the space above or below the lamp.

Referring to the drawings, FIGURE 1 illustrates a preferred embodiment of an insect exterminating lamp 10 supported on a horizontal surface such as a table 11, and FIGURE 2 shows lamp 10 alternatively supported on a vertical supporting surface such as wall 12.

In the illustrated embodiment the lamp has a flat generally square supporting base 13 with depending no-mar feet 14 secured in sockets at each corner of the base for supporting the lamp on table 11. The base is preferably relatively heavy to provide a stable lamp, and may be of a material such as cast iron or steel plate. The base has a boss 15 extending upwardly from a central portion thereof with an upwardly opening generally vertical socket 16.

A container or hopper 17 overlies and is mounted on base 13. A stud 18 extends downwardly from the bottom of the container and is removably and snugly received in boss socket 16. Stud 18 and boss socket 16 may be provided with cooperating threads for more securely mounting the hopper on the base, if desired. Container 17 is preferably opaque and imperforate and extends upwardly from base 13 to an upper open end. In the preferred embodiment container 17 is of inverted generally conical configuration, and of anodized aluminum.

A generally Z-shaped handle member 20 is secured to base 13 as by welding 21 and has a supporting standard 22 spaced outwardly from boss 15 and extending upwardly and inclined outwardly from the base. Supporting means at the upper end of standard 22 are provided for attaching the lamp to wall 12. These means include a bracket 23 suitably secured to the top end of standard 21, with a central U-shaped portion spaced outwardly from the standard and defining an opening for receiving an upwardly extending tongue of a bracket 24 suitably secured to wall 12 as by nails. Alternatively, the lamp may be supported by a peg, such as a nail (not shown), extending outwardly from wall 12 and received in a hole 25 in the upper end of standard 22. A lower arm 26 extends generally horizontally outwardly from the base and has a return portion 27 at its free end for abutting wall 12, to stabilize the lamp on the wall. An upper arm 28 of the Z-shaped handle member 20 extends inwardly from the upper end of standard 21 and mounts a hood 30.

Hood 30 is substantially imperforate and opaque and includes a generally horizontal plate 31 attached to upper arm 28 in any suitable manner as by welding. Hood 30 also has an outer cover 32 with a dome-shaped top 33 overlying plate 31. A plurality of depending brackets 34 are attached to top 33 in any suitable manner as by welding. Bolts 35 extend upwardly through holes in plate 31 and are each threadedly received by a bracket 34 for removably mounting cover 32 on plate 31. A continuous flange 36 extends downwardly and inwardly from the periphery of top 33 and is slightly spaced above and extends outwardly from the upper open end of container 17. Plate 31 and top 33 define an insulating air space therebetween for retarding heating of the cover.

An electric connector 38 is suitably secured in a central aperture in plate 34 and has a downwardly opening female electric light bulb socket centrally overlying container 17 and boss socket 16. An electric light bulb 39 is removably received in the connector socket and depends therefrom into container 17 and is substantially entirely encased in a vertical direction by the container. A beam of light from this bulb extends horizontally outwardly through the space between the hood and container for attracting insects. Flying insects attracted by the light from bulb 39 enter the lamp through this space and fall into the container and away from the connection between the light bulb and connector 38 to avoid contaminating this connection.

Light bulb 39 preferably provides a cold color beam, such as a bluish or greenish color for more effectively attracting insects. It has been found that a cold color is more effective in attracting insects than white or warm color light sources. Bulb 39 is preferably of a heat producing type such as an incandescent bulb and in the preferred embodiment a blue, or preferably green 25-watt incandescent light bulb has been found to be adequate.

Thus, container 17 provides a shield encasing light bulb 39 and extends upwardly to about the top of the illuminated portion of the bulb for concealing the most intensely illuminated bottom portion of the bulb from direct view. In order to increase the intensity of light projecting through the opening between the hood and container, the lower surface of hood 30 preferably has a high light reflectance, as may be provided in suitable or conventional manner such as by a high gloss light color and preferably cold color enamel, as gray.

Hood 30 helps retain heat in the hopper and retards the circulation of air therein. Since bulb 39 is vertically encased within container 17 the heat from the bulb evacuates air from the container so as to suffocate any insects falling therein. Heat from the bulb is also effective in killing or stunning insets upon direct contact with the hot bulb or container wall. By providing an imperforate container and hood no light is projected above or below the lamp nor are shadows of dead insects projected from the lamp. The periphery of hood 30 extends outwardly from container 17 and helps in preventing inadvertent contact with the normally hot container.

An electric switch 40 is mounted on hood 30 and extends upwardly from the vertex of dome-shaped top 33. This switch is connected in circuit with connector 38 and an electric cable 41 leading to a suitable source of electric power, for turning light bulb 39 on and off. By mounting switch 40 on the top of hood 30 it is more easily accessible than if mounted on the base of lamp 10, and the insulated air space in hood 30 maintains switch 40 at a relatively cool temperature.

The lamp exterminates insects in an effective, dry and odorless manner. Only container 17 and bulb 39 are likely to become contaminated by remains of insects, and these parts may be easily removed, the dead insects dumped from the container, and both the bulb and container thoroughly washed in a small pan, without wetting the remainder of the lamp.

While a preferred embodiment of the invention has been shown and described in detail herein, the invention is susceptible of embodiment in many different forms, and the present disclosure is to be considered as an exemplification of the principles of the invention and is not intended to limit the invention to the embodiment illustrated. The scope of the invention will be pointed out in the appended claim.

I claim:

An insect exterminating electric lamp comprising: a flat generally horizontal base, said base having a centrally located upwardly extending boss with an upwardly opening vertical socket; an inverted generally conical substantially imperforate and opaque container overlying said base, said container having an open upper end; a stud extending downwardly from the bottom of said container and removably and snugly received in the boss socket; a generally Z-shaped handle secured to the base and having a supporting standard spaced outwardly from said boss and extending upwardly from said base with supporting means at the upper end for removably attaching the lamp to a vertical support, an upper arm extending inwardly from the upper end of said standard, and a lower arm on the lower end of said standard and extending outwardly from and secured to said base with an outer free end for abutting the vertical support; a substantially imperforate and opaque hood mounted on the upper end of said standard and completely overlying, spaced above and extending outwardly from said open end of said container, said hood having a dome-shaped circular top with a downwardly and inwardly extending substantially continuous peripheral flange, a generally horizontal plate secured to said top within said flange and spaced downwardly from the vertex of said dome top and defining an insulating air space between the top and plate, said plate being attached to the upper arm and having an undersurface with a high light reflectance; an electric connector mounted on said hood and attached to said plate, said connector having a female light bulb socket opening downwardly from the hood for receiving a depending electric light bulb having an illuminating portion substantially entirely within said container.

References Cited in the file of this patent

UNITED STATES PATENTS

| | | |
|---|---|---|
| 1,189,520 | Adam | July 4, 1916 |
| 1,713,557 | Sauer | May 21, 1929 |
| 2,065,047 | Buford | Dec. 22, 1936 |
| 2,384,930 | Kendrick | Sept. 18, 1945 |
| 2,608,022 | Wright | Aug. 26, 1952 |